US005540809A

United States Patent [19]
Ida et al.

[11] Patent Number: 5,540,809
[45] Date of Patent: Jul. 30, 1996

[54] APPARATUS FOR REMOVING PROTECTIVE FILMS

[75] Inventors: Ryoichi Ida, Honjo; Mitsuhiro Fujimoto, Saitama-ken; Tatsumi Kobayashi, Yokohama, all of Japan

[73] Assignee: Canon Kabushiki Kaisha, Tokyo, Japan

[21] Appl. No.: 155,644

[22] Filed: Nov. 22, 1993

[30] Foreign Application Priority Data

Dec. 9, 1992 [JP] Japan .................. 4-329460

[51] Int. Cl.⁶ .................. B32B 35/00
[52] U.S. Cl. .................. 156/584; 156/344; 271/33
[58] Field of Search .................. 156/344, 584; 271/33, 307; 118/245

[56] References Cited

U.S. PATENT DOCUMENTS

| | | | |
|---|---|---|---|
| 3,154,434 | 10/1964 | Rosenthal | 118/245 |
| 4,670,085 | 6/1987 | van der Meer et al. | 156/584 |
| 4,714,427 | 12/1987 | Tsuruoka et al. | 432/59 |
| 4,754,962 | 7/1988 | Kontz | 271/307 |
| 4,880,488 | 11/1989 | Matsuo et al. | 156/344 |
| 4,959,115 | 9/1990 | Lacy | 156/289 X |

FOREIGN PATENT DOCUMENTS

| | | | |
|---|---|---|---|
| 1053379 | 3/1986 | Japan | 156/584 |
| 0152707 | 7/1987 | Japan | 156/584 |

Primary Examiner—Mark A. Osele
Attorney, Agent, or Firm—Fitzpatrick, Cella, Harper & Scinto

[57] ABSTRACT

In an apparatus for removing protective films, a groove is formed in a roller having an adhesive surface sufficient to peel off a protective film from a printed wiring board. The exposed printed wiring board, on which a dry film provided with a protective film is applied, is passed between the rollers. Thus, the protective film is peeled off from the surface of the dry film resist of the printed wiring board and adhered to the roller so as to be removed. As a result, the protective film can be removed at a high speed, and automated removal of protective films can be achieved.

21 Claims, 4 Drawing Sheets

PRIOR ART

PRIOR ART 5,540,809

APPARATUS FOR REMOVING PROTECTIVE FILMS

BACKGROUND OF THE INVENTION

1. Field of the Invention

The present invention relates to an apparatus for removing protective films of a printed wiring board in which a dry film provided with a protective film is used during the manufacturing of printed wiring boards. A protective film is removed before the film is developed.

2. Description of the Related Art

In some steps for manufacturing printed wiring boards, dry film resists are used for etching, plating or solder masking. In etching and plating resists, patterns are formed by using resist ink by means of a screen printing method. In recent years, there has been a great demand for lighter, thinner, shorter, and smaller electronic apparatuses, and there has been a tendency for the patterns of printed wiring boards to be finer. Dry film resists having excellent resolution have come to be widely used, and the amount that is used is increasing sharply.

In the step for manufacturing printed wiring boards by using such dry film resists, a dry film resist which is cleaned and polished in preliminary treatment is bonded and applied to a laminated sheet by a laminator. Then, the dry film resist is developed through an exposure step, and etching or plating is performed. The dry film resist used as a solder mask is cured and fixed after being developed, and then sent to the next step.

Dry film resists used in this manner are usually formed of a three-layer structure consisting of a base film, a resist and a cover film. In the above-described step for bonding and applying a dry film resist to a laminated sheet by means of a laminator, while the cover film is being taken up on a roller, it is bonded and applied in a state in which the resist surface is directly in contact with the surface of the laminated sheet. At this time, the base film remains on the topmost surface of the sheet. The base film is usually a thin polyester film, and protects resists (hereinafter the base film of the dry film resist will be referred to as a protective film). Although the exposure step can be performed on a dry film resist provided with a protective film, the protective film must be removed because if it remains, it will be an obstacle to the next development step. For this reason, hitherto, the protective film has been peeled off manually after the exposure step and thereafter put into a development apparatus.

As the number of fine patterns of a printed wiring board has increased, there has been an increase in the use of printed wiring boards in manufacturing dry film resists having excellent resolutions. On the other hand, costs have increased because manual labor is required to peel off the protective films, and defects occur when inexperienced users handle it improperly. Therefore, there has been a great demand for the automation of peeling off protective films.

Recently, automatic peeling apparatuses for peeling off protective films have been released on the market against such a background. One example is the apparatus shown in FIGS. 6 and 7, in which a sheet travelling in the direction of the arrow is stopped at a start position of a protective film 7 of a dry film resist 6 applied onto a printed wiring board 5. A hold such as a notch is made by a cutter blade or a needle 8. Next, air is blown from an air blowout opening 9 while the board 5 is being moved in the direction of the arrow to remove the protective film. Another example is an apparatus, as shown in FIG. 8, in which an adhesive tape 10 is applied to the surface of the protective film 7 of the dry film resist 6 applied onto the printed wiring board 5. The protective film 7 is peeled off with the adhesive tape 10 and are taken up by a take-up roller 11.

However, the method of the above-mentioned former apparatus of the prior art has a problem in that if the start notch position varies, the protective film cannot be completely removed. Also, when this type of automatic apparatus temporarily is stopped in order to reposition, the operation speed is limited, and an obstacle to achieving high speed of the line arises. Problems may also arise, for example, because variations in the position at which a dry film is applied may make the start notch position improper, preventing the dry film from being completely removed, or since air is blown, cut pieces of the film may adhere, causing defective development. Mass-production thereof is difficult.

Although the problems of peeling off protective films have been somewhat reduced by the method shown in FIG. 8, because the adhesive tape used for peeling off protective films which is consumed in proportion to the amount of the protective film is discarded after use, a large amount of materials are used, increasing manufacturing costs. There is another problem, for example, when dry film resists of different sizes are processed, it is necessary to adjust the position each time they are processed, causing the automatic apparatus to stop for the setup, thus lowering the overall operating ratio of the line and increasing costs.

SUMMARY OF THE INVENTION

It is an object of the present invention to provide a protective film removing apparatus which is capable of performing steps of polishing, cleaning, lamination, exposure, removal of protective films, development, and removal of protective films efficiently and reliably at a low cost during the manufacturing of printed wiring boards in which a dry film provided with a protective film is used, with the step of removing protective films being an obstacle to making the entire inline automatic.

It is another object of the present invention to provide the apparatus described below for removing protective films. For example, a groove shown in FIG. 5 is formed in a roller having an adhesive outer surface sufficient for peeling off protective films. An exposed printed wiring board on which a dry film provided with a protective film is applied as shown in FIG. 3 is passed between the rollers, so that the protective film is brought into contact with the roller surfaces, causing the protective film to peel off from the dry film resist surface and to adhere to the roller surfaces.

Next, a separator disposed in the groove between the rollers as shown in FIG. 5 may take any shape such as, for example, a plate shape or a cubic shape. A protective film adhered to the roller surfaces is separated therefrom by this separator while the roller is being rotated. Therefore, the operation can be continuously performed because an adhesive surface on the roller surfaces, capable of adhering the next new protective film, appears.

In one aspect of the invention, an apparatus for removing a film comprises a roller member with an adhesive outer surface for adhering a film thereto, and separating means, cooperating with the roller member, for separating the film from the adhesive surface of the roller member as it is rotated.

In accordance with another aspect of the invention, the apparatus includes roller members each provided with at least one groove and having an adhesive outer surface for adhering thereto a protective film, and a separator cooperating with each roller member and having a portion extending into the groove, with the separators separating the film from the outer surface of the roller members as they are rotated.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENT

A preferred embodiment of the present invention will be explained below with reference to the accompanying drawings.

Figure 1:
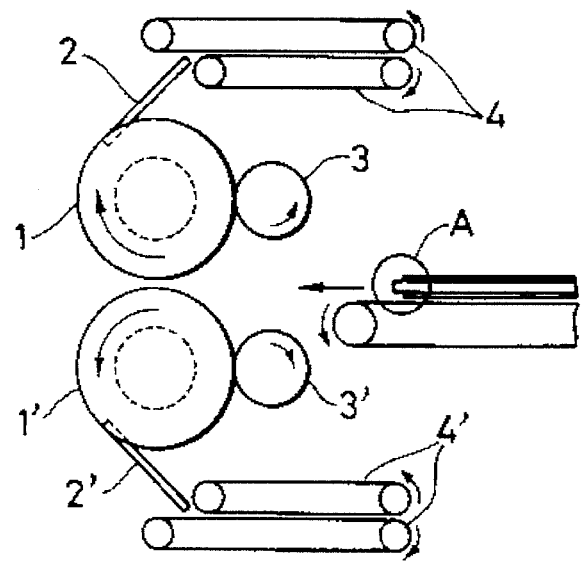
FIG. 1 is an illustration of the construction of an apparatus in accordance with an embodiment of the present invention.
Figure 5:
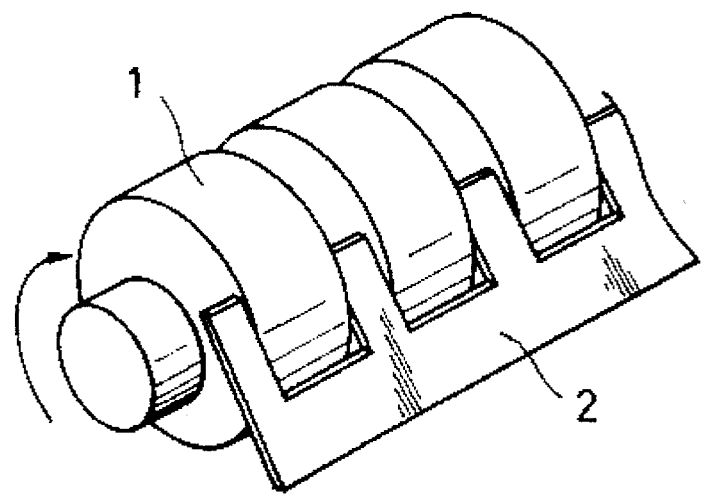
FIG. 5 is a perspective view of one portion of the present invention.
Figure 6:
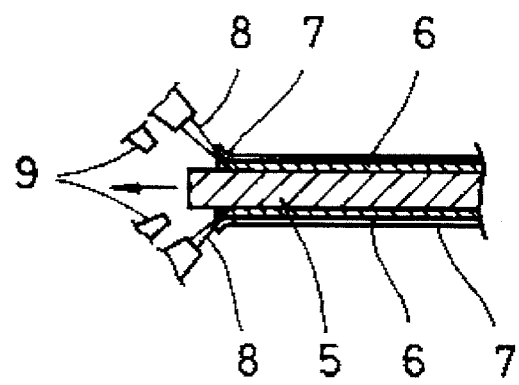
FIG. 6 illustrates a state in which a protective film separation hold is produced in the prior art.
Figure 7:
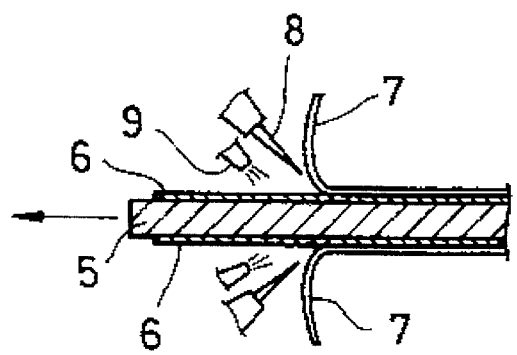
FIG. 7 illustrates a state in which air is blown onto the raised portion of FIG. 6.
Figure 8:
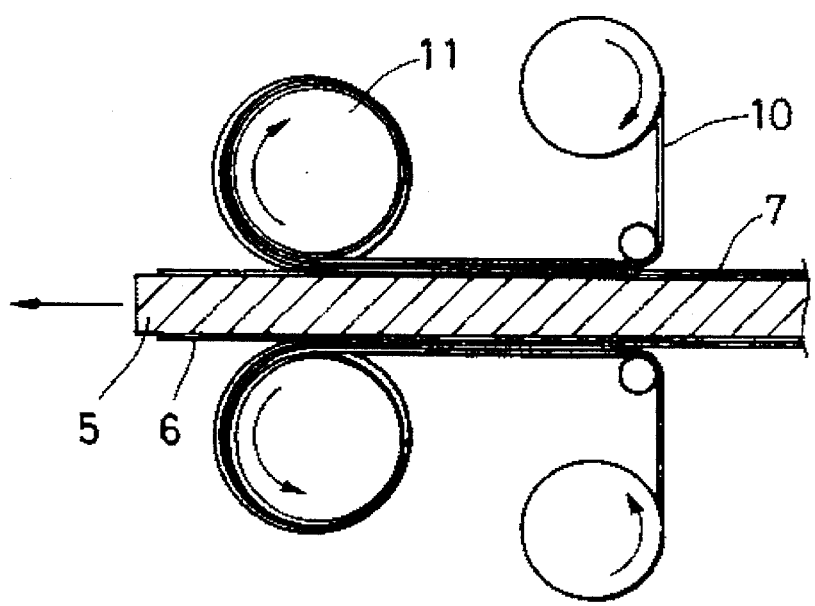
FIG. 8 is an illustration of another example of the prior art.

FIG. 1 illustrates an apparatus for removing protective films in accordance with an embodiment of the present invention. Basically, this apparatus comprises rollers 1 and 1' having an adhesive outer surface, and separators 2 and 2' for separating the protective film 7. As shown in the figure, the rollers may be operated as a pair, or separately,. FIG. 5 is a perspective view illustrating the adhesive roller 1 and the separator 2. The separator 2 may have a shape such as, for example, a flat plate or a circular cylinder, and the roller 1 may have one or more grooves that receives part of the separator. The separator can be disposed to remain stationary as the roller rotates and can also pivot relative to the roller. Incidental to this, to remove contaminants on the surface of the adhesive roller 1 so as to maintain its adhesiveness, cleaning rollers 3 and 3' and protective film transfer belts 4 and 4' for removing the separated protective film 7' may be disposed so as to increase the operational efficiency of the apparatus.

Figure 2:
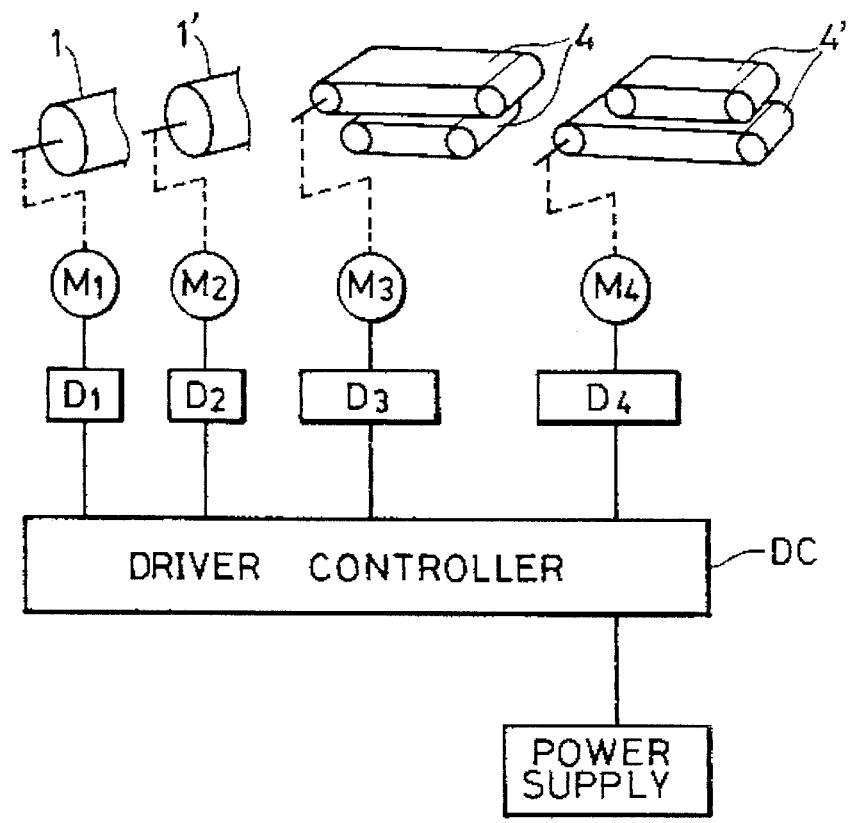
FIG. 2 is a diagram of a circuit for driving the protective film removing apparatus of the present invention.

FIG. 2 is a diagram of a circuit for driving the protective film removing apparatus of the present invention. Motors $M_1$ and $M_2$ for rotating the rollers 1 and 1' and motors $M_3$ and $M_4$ for rotating the protective film transfer belts 4 and 4' are prepared. The circuit is formed of drivers $D_1$, $D_2$, $D_3$ and $D_4$ for driving the motors $M_1$, $M_2$, $M_3$ and $M_4$, respectively, and a driver controller DC for controlling the drivers $D_1$, $D_2$, $D_3$ and $D_4$.

Each of the elements shown in block outline in FIG. 2 is well known per se, and a specific type of construction is not critical to carrying out the invention or to a disclosure of the best mode for carrying out the invention.

Figure 3:
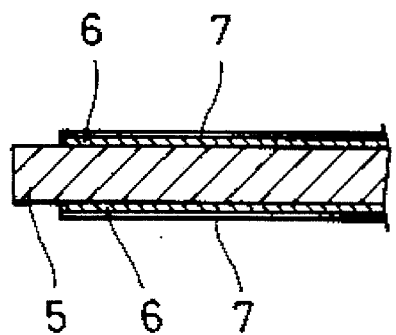
FIG. 3 is an enlarged view of portion A in FIG. 1 of a printed wiring board before a protective film is peeled off.
Figure 4:
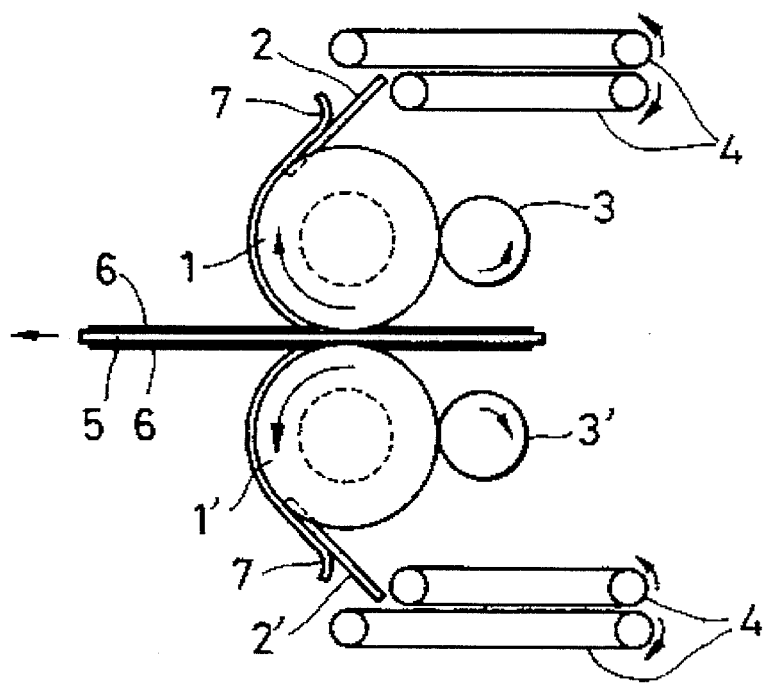
FIG. 4 illustrates a state in which the protective film on the printed wiring board is peeled off and separated by the apparatus of the present invention.

FIG. 4 illustrates an operation for removing protective films by the protective film removing apparatus in accordance with this embodiment. The printed wiring board 5, on which the protective film 7 having the dry film resist 6 shown in FIG. 3 thereon is adhered, is positioned to be contact with the rotating adhesive rollers 1 and 1' of the apparatus shown in FIG. 1. It is possible to position the board 5 by insetting it manually or transferring it by a roller conveyor.

The wiring board 5 in contact with the adhesive rollers 1 and 1' is moved in the direction of the arrow as the rollers 1 and 1' are rotated. The protective film 7 on the topmost layer of the printed wiring board 5 is peeled off when it becomes adhered to the surface of the rotating adhesive rollers 1 and 1'. When the protective film 7 peeled off by this rotation reaches the position of the separators 2 and 2', it is separated and removed from the adhesive rollers 1 and 1' by a flat top surface of the separators 2 and 2'. The protective film 7 is then removed by appropriate means such as the transfer belts 4 and 4'.

As described above, the protective film adheres to the surface of the roller and then peels off from the surface of the dry film resist by making the wiring board, on which the dry film resist provided with a protective film is applied, pass between a pair of rotating adhesive rollers. The separated protective film can be separated from the surface of the roller by means of the separator disposed in the groove portion or portions of the roller so that the adhesive surface is uncovered. Thus, the protective film can be peeled off from a portion of the dry film resist where it is brought into contact with the roller for the first time regardless of the position at which the film is applied. As a result, there is no need to stop the wiring board in order to adjust the position thereof for the purpose of separating protective films, and it is possible to peel end remove protective films continuously.

If a high-speed operation is possible and if the width of the roller is determined, a protective film can be peeled off of the wiring board if it has a width the same as or less than the width of the roller. Therefore, the protective film may be applied in a random manner without changing the setting of the apparatus after the apparatus is stopped each time because of width adjustment or the like depending upon the width of the wiring board, making possible inline automation while maintaining an excellent operating ratio. In addition, there is no risk of adhesion of contaminants because air is not circulated and no adhesive tape is used. Thus, no extraneous materials are consumed and costs do not increase.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the claims. The following claims are to be accorded a broad interpretation, so as to encompass all such modifications and equivalent structures and functions.

What is claimed is:

1. An apparatus for removing protective films, the apparatus comprising:

a roller member provided with at least one peripheral groove, said roller member having an adhesive outer surface for removing a protective film from a printed wiring board and adhering the film to said adhesive outer surface;

a separator, a portion of which is disposed within said groove, for separating the protective film from said adhesive outer surface of said roller member as said roller member is rotated; and cleaning means for cleaning said adhesive outer surface of said roller member.

2. An apparatus for removing protective films according to claim 1, further comprising film disposal means positioned proximate to said separator for removing the film separated by said separator.

3. An apparatus for removing protective films according to claim 2, wherein said film disposal means comprises first and second endless belts for transferring the film separated by said separator.

4. An apparatus for removing protective films according to claim 2, further comprising drive means for controlling operation of said roller member and said film disposal means.

5. An apparatus for removing protective films according to claim 1, wherein said cleaning means comprises a cleaning roller in rotational engagement with said roller member for removing contaminants from said outer surface.

6. An apparatus for removing protective films according to claim 1, wherein said separator cooperates with said roller member to be substantially stationary as said roller member rotates.

7. An apparatus for removing protective films according to claim 1, wherein said roller member includes two peripheral grooves, and said separator includes first and second portions disposed in said grooves.

8. An apparatus for removing protective films, the apparatus comprising:

a plurality of roller members each provided with at least one groove and having an adhesive outer surface for removing a protective film from a printed wiring board and adhering the film to said adhesive outer surface;

a separator engaged with each said roller member and having a portion extending into said at least one groove, with each said separator separating protective films from said adhesive outer surface of one of said roller members as said roller members are rotated; and cleaning means for cleaning said adhesive outer surface of said roller member.

9. An apparatus for removing protective films according to claim 8, further comprising film disposal means positioned proximate to said separator for removing the film separated by said separator.

10. An apparatus for removing protective films according to claim 9, wherein said disposal means comprises first and second endless belts for transferring the film separated by said separator.

11. An apparatus for removing protective films according to claim 9, further comprising drive means for controlling operation of said roller member and said film disposal means.

12. An apparatus for removing protective films according to claim 8, wherein said cleaning means comprises a cleaning roller in rotational engagement with each said roller member for removing contaminants from said outer surfaces.

13. An apparatus for removing protective films according to claim 8, wherein said separators cooperate with said roller members to be substantially stationary as said roller members rotate.

14. An apparatus for removing protective films according to claim 8, wherein each said roller member includes two space peripheral grooves, and each separator includes first and second portions extending into said first and second grooves of one of said roller members.

15. An apparatus for removing a film layer, the apparatus comprising:

a roller member provided with at least one peripheral groove, said roller member having an adhesive outer surface for removing a film layer from a surface and adhering the film layer to said adhesive outer surface;

a separator, a portion of which is disposed within said groove, for separating the film layer from said adhesive outer surface of said roller member as said roller member is rotated; and cleaning means for cleaning said adhesive outer surface of said roller member.

16. An apparatus for removing a film layer according to claim 15, further comprising film disposal means positioned proximate to said separator for removing the film separated by said separator.

17. An apparatus for removing a film layer according to claim 16, wherein said film disposal means comprises first and second endless belts for transferring the film separated by said separator.

18. An apparatus for removing a film layer according to claim 16, further comprising drive means for controlling operation of said roller member and said film disposal means.

19. An apparatus for removing a film layer according to claim 15, wherein said cleaning means comprises a cleaning roller in rotational engagement with said roller member for removing contaminants from said outer surface.

20. An apparatus for removing a film layer according to claim 15, wherein said separator cooperates with said roller member to be substantially stationary as said roller member rotates.

21. An apparatus for removing a film layer according to claim 15, wherein said roller member includes two peripheral grooves, and said separator includes first and second portions disposed in said grooves.

\* \* \* \* \*

UNITED STATES PATENT AND TRADEMARK OFFICE
CERTIFICATE OF CORRECTION

PATENT NO. :   5,540,809
DATED      :   July 30, 1996
INVENTOR(S) :  Ida et al.

It is certified that error appears in the above-indentified patent and that said Letters Patent is hereby corrected as shown below: On the title page, item:

[56]  REFERENCES CITED:

FOREIGN PATENT DOCUMENTS, "1053379  3/1996  Japan" should read --61-53379  3/1986  Japan--.

COLUMN 4:

Line 38, "end" should read --and--.

Signed and Sealed this

Twenty-fifth Day of February, 1997

Attest:

BRUCE LEHMAN

*Attesting Officer*     *Commissioner of Patents and Trademarks*